UNITED STATES PATENT OFFICE.

JOSEPH DEINET, OF ELBERFELD, GERMANY, ASSIGNOR TO FARBENFABRIKEN VORM. FRIEDR. BAYER & CO., OF ELBERFELD, GERMANY, A CORPORATION OF GERMANY.

GREEN ANTHRACENE DYE.

No. 893,837.     Specification of Letters Patent.     Patented July 21, 1908.

Application filed March 17, 1908. Serial No. 421,659.

*To all whom it may concern:*

Be it known that I, JOSEPH DEINET, citizen of the German Empire, residing at Elberfeld, Germany, Kingdom of Prussia, have invented new and useful Improvements in Green Anthracene Dye, of which the following is a specification.

My invention relates to the production of a new dyestuff of the anthracene series from which a "vat" can be prepared and which dyes unmordanted cotton green shades from such a "vat."

The process for preparing the new dyestuff consists in treating with nitric acid mixtures of the known dyestuff "indanthrene" (see United States Letters Patent 682523 dated September 10, 1901) and nitrobenzene.

In carrying out my new process pactically I can proceed as follows, the parts being by weight: 10 parts of a 95 per cent. nitric acid are added to a mixture of 10 parts of indanthrene and 150 parts of nitrobenzene. The mixture is stirred for several hours and then heated to 60–65° C. for half an hour. The insoluble part which forms the new product is separated by filtration and washed with alcohol and water. It is a grayish-green powder soluble in concentrated sulfuric acid with a yellowish-brown color, green flakes being precipitated on pouring the solution into water. It is almost insoluble in organic solvents and dyes unmordanted cotton from an alkaline "vat" (hydrosulfite of sodium and caustic soda) blue shades which turn green on oxidation by the air.

Having now particularly described my invention and in what manner the same is to be performed, I declare that what I claim is:—

The herein-described new dyestuff of the anthracene series, which can be obtained by treating with nitric acid a mixture of the known dyestuff "indanthrene" and nitrobenzene, which dyestuff is a grayish-green powder soluble in concentrated sulfuric acid with a yellowish-brown color, green flakes being precipitated on pouring the solution in water, giving a blue vat with hydrosulfite and caustic soda lye, which vat dyes unmordanted cotton blue shades which turn green on oxidation by the air, substantially as described.

In testimony whereof I have hereunto set my hand in the presence of two subscribing witnesses.

JOSEPH DEINET. [L. S.]

Witnesses:
   OTTO KÖNIG,
   WM. WASHINGTON BRUNSWICK.

---

It is hereby certified that in Letters Patent No. 893,837, granted July 21, 1908, upon the application of Joseph Deinet, of Elberfeld, Germany, for an improvement in "Green Anthracene Dye," an error occurs in the printed specification requiring correction, as follows: In line 18 the word "pactically" should read *practically;* and that the said Letters Patent should be read with this correction therein that the same may conform to the record of the case in the Patent Office.

Signed and sealed this 8th day of September, A. D., 1908.

[SEAL.]                            C. C. BILLINGS,
                                          *Acting Commissioner of Patents.*

UNITED STATES PATENT OFFICE.

JOSEPH DEINET, OF ELBERFELD, GERMANY, ASSIGNOR TO FARBENFABRIKEN VORM. FRIEDR. BAYER & CO., OF ELBERFELD, GERMANY, A CORPORATION OF GERMANY.

GREEN ANTHRACENE DYE.

No. 893,837.     Specification of Letters Patent.     Patented July 21, 1908.

Application filed March 17, 1908. Serial No. 421,659.

*To all whom it may concern:*

Be it known that I, JOSEPH DEINET, citizen of the German Empire, residing at Elberfeld, Germany, Kingdom of Prussia, have invented new and useful Improvements in Green Anthracene Dye, of which the following is a specification.

My invention relates to the production of a new dyestuff of the anthracene series from which a "vat" can be prepared and which dyes unmordanted cotton green shades from such a "vat."

The process for preparing the new dyestuff consists in treating with nitric acid mixtures of the known dyestuff "indanthrene" (see United States Letters Patent 682523 dated September 10, 1901) and nitrobenzene.

In carrying out my new process pactically I can proceed as follows, the parts being by weight: 10 parts of a 95 per cent. nitric acid are added to a mixture of 10 parts of indanthrene and 150 parts of nitrobenzene. The mixture is stirred for several hours and then heated to 60-65° C. for half an hour. The insoluble part which forms the new product is separated by filtration and washed with alcohol and water. It is a grayish-green powder soluble in concentrated sulfuric acid with a yellowish-brown color, green flakes being precipitated on pouring the solution into water. It is almost insoluble in organic solvents and dyes unmordanted cotton from an alkaline "vat" (hydrosulfite of sodium and caustic soda) blue shades which turn green on oxidation by the air.

Having now particularly described my invention and in what manner the same is to be performed, I declare that what I claim is:—

The herein-described new dyestuff of the anthracene series, which can be obtained by treating with nitric acid a mixture of the known dyestuff "indanthrene" and nitrobenzene, which dyestuff is a grayish-green powder soluble in concentrated sulfuric acid with a yellowish-brown color, green flakes being precipitated on pouring the solution in water, giving a blue vat with hydrosulfite and caustic soda lye, which vat dyes unmordanted cotton blue shades which turn green on oxidation by the air, substantially as described.

In testimony whereof I have hereunto set my hand in the presence of two subscribing witnesses.

JOSEPH DEINET. [L. S.]

Witnesses:
    OTTO KÖNIG,
    WM. WASHINGTON BRUNSWICK.

---

It is hereby certified that in Letters Patent No. 893,837, granted July 21, 1908, upon the application of Joseph Deinet, of Elberfeld, Germany, for an improvement in "Green Anthracene Dye," an error occurs in the printed specification requiring correction, as follows: In line 18 the word "pactically" should read *practically;* and that the said Letters Patent should be read with this correction therein that the same may conform to the record of the case in the Patent Office.

Signed and sealed this 8th day of September, A. D., 1908.

[SEAL.]
           C. C. BILLINGS,
           *Acting Commissioner of Patents.*

Correction in Letters Patent No. 893,837.

It is hereby certified that in Letters Patent No. 893,837, granted July 21, 1908, upon the application of Joseph Deinet, of Elberfeld, Germany, for an improvement in "Green Anthracene Dye," an error occurs in the printed specification requiring correction, as follows: In line 18 the word "pactically" should read *practically;* and that the said Letters Patent should be read with this correction therein that the same may conform to the record of the case in the Patent Office.

Signed and sealed this 8th day of September, A. D., 1908.

[SEAL.]

C. C. BILLINGS,
*Acting Commissioner of Patents.*